Aug. 28, 1928.
S. A. DOBYNE
1,682,217
BELT DRIVE MECHANISM
Filed Jan. 20, 1922
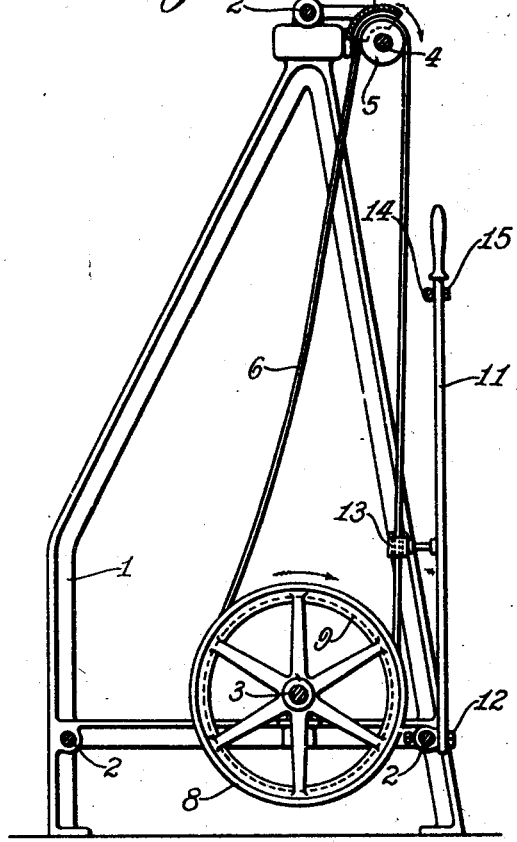
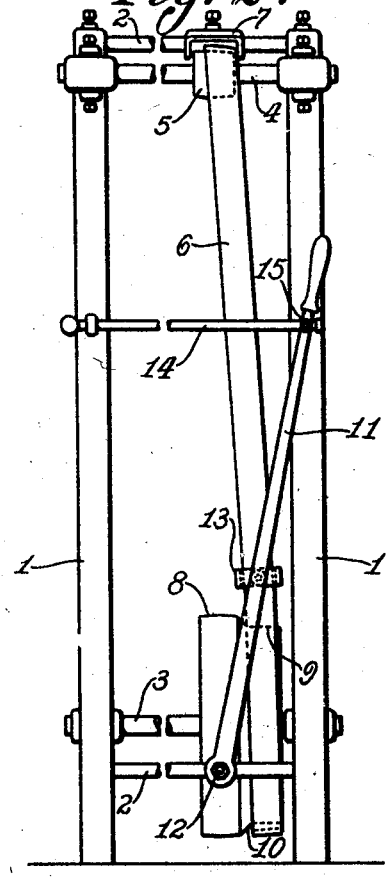
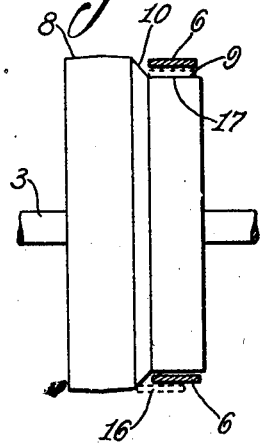
Inventor:
Stephen A. Dobyne,
By John W. Bruninga
His Attorney Patented Aug. 28, 1928.

1,682,217

UNITED STATES PATENT OFFICE.

STEPHEN A. DOBYNE, OF ST. LOUIS, MISSOURI, ASSIGNOR TO CHAMPION SHOE MACHINERY COMPANY, OF ST. LOUIS, MISSOURI, A CORPORATION OF MISSOURI.

BELT-DRIVE MECHANISM.

Application filed January 20, 1922. Serial No. 530,551.

This invention relates to belt drive mechanism and more particularly to means for rendering such mechanism operative or inoperative.

One of the objects of this invention is to provide a belt drive mechanism in which the belt may be shifted from driving engagement with the pulley, but will be retained in position for reengagement.

Another object of this invention is to provide a belt drive mechanism in which the belt may be shifted from non-driving position to driving engagement with the pulley in such a way that driving engagement begins before the belt is shifted on to the driving pulley.

Another object of this invention is to provide a belt drive mechanism in which provision is made for receiving the belt when not in driving engagement, said receiving means rotating with the pulley so as to not require separate lubrication, as in the case of a loose pulley.

Further objects will appear from the detail description taken in connection with the accompanying drawing, in which:

Figure 1 is a side elevation of a machine embodying this invention;

Figure 2 is a front elevation of the machine of Figure 1; and

Figure 3 is a detail showing the relation of the belt to the pulley.

Referring to the accompanying drawing, the machine may comprise a frame constructed of a pair of end brackets 1 connected by cross members 2 and having a pair of shafts 3 and 4. Either of these shafts may be the driving shaft and the other the driven shaft. For the sake of explanation, it will be assumed that the shaft 3 is the driving shaft and 4 the driven shaft. The shaft 4 may be provided with a belt pulley 5 of any usual design, adapted for driving engagement with the belt 6. A belt guide 7 may be provided to keep the belt on the pulley. Such a guide will not be necessary, however, in all cases. The shaft 3 may be provided with a pulley having a driving face 8, crowned in the manner usual, for driving pulleys, and a belt receiving face 9 which may be straight. These two faces are spaced a short distance axially from one another, and may be joined by the conical surface 10. Any usual belt shifting device may be provided, such as the lever 11 pivoted at 12 on the frame, and provided with a belt guide 13 adapted to shift the belt. A sliding cross-rod 14 pivoted at 15 to the lever 11 may be provided so that the belt may be shifted by the operator standing opposite any part of the machine.

In operation when the belt 6 is in driving engagement with the driving face 8, it will drive the pulley 5 so as to operate the machine. By shifting the lever 11 to the right, Figure 2, the guide 13 will shift the belt off of the driving face 8 to be received by the straight face 9. The face 9 is of smaller diameter than the face 8 so that when upon this face, the belt will not have sufficient tension for driving engagement, and the pulley face 9 will rotate within the loose loop of the idle belt. The belt will, therefore, remain stationary while the pulley 9 revolves, and the machine will be rendered inoperative. When it is desired to start the machine, the operator shifts the lever 11 to the left, Figure 2. Before shifting, the belt will have the solid line position shown in Figure 3. Upon shifting, on one side of the belt one edge will begin to rise upon the conical surface 10 as indicated in dotted lines at 16. This will have the effect of drawing the remainder of the loop of the belt against the back face 9 as indicated in dotted lines at 17. Driving engagement will thereupon begin and the belt will start to run. Upon the belt starting to run, the well known tendency of a runing belt to seek the highest part of the pulley upon which it runs will cause the belt to quickly climb up the conical surface 10 to the driving face 8, which, being crowned in the usual manner, will retain the belt thereon in driving engagement. The belt will thus be tightened on both the driving and driven pulleys so as to drive the machine.

It will be obvious that this arrangement does away with the usual fast and loose pulley arrangement, in which the loose pulley must be arranged to rotate on the shaft and must, therefore, be lubricated. The lubricating devices for this purpose nearly always give trouble, and are at least a source of care and an item of expense in maintenance. In the present device, the loose pulley is replaced by a belt receiving face on the running pulley which receives the belt out of driving engagement but retains the same in position for immediate reengagement with the driving face. Upon shifting to the driving face, driving engagement really begins before the belt reaches the driving face so that the belt is started running really before shifting to the driving face, which renders such shifting much easier and more certain. The conical surface 10 serves not only to tighten the belt preliminary to shifting but also to guide the belt during the shifting movement.

In practice, the diameter of the face 9 is so adjusted with respect to the diameter of the face 8, that the belt will just slip when on the face 9 sufficient to allow free rotation of the pulley therewithin and at the same time when the belt is shifted onto the conical surface 10 as indicated at 16, that the belt will be tightened to a sufficient extent on the face 9 to start the machine. It will be obvious that with a driven machine of small inertia, a looser fit of the belt on the face 9 may be allowed than with a machine having great inertia. In the latter case the larger diameter of the face 9 may be permitted since a closer fit of the belt on the face 9 may be permitted without starting the machine. Such a close fit will also assist in promptly starting a heavy machine when the belt is shifted to the surface 10 as indicated at 16.

It is obvious that various changes may be made in details of construction without departing from the spirit of this invention; it is, therefore, to be understood that this invention is not to be limited to the specific details shown and described.

Having thus described the invention, what is claimed is:

1. Belt drive mechanism, comprising, a driving pulley having integrally thereon a belt-driving face and a belt-receiving face adapted for non-driving engagement with the belt, a driven pulley, a belt-shafting guide at said driving pulley, and a stationary belt guide at said driven pulley.

2. Belt drive mechanism, comprising a driving pulley having integrally thereon belt faces of different diameters, the face of larger diameter being adapted to engage a belt for driving, and the face of smaller diameter being adapted to loosely receive said belt in non-driving engagement, when said belt is idle, a belt guiding face connecting said belt faces, a driven pulley adapted to engage said belt when the belt is in engagement with said driving face and with said non-driving face of the driving pulley.

3. Belt drive mechanism comprising a driving pulley and a driven pulley, said driving pulley having integrally thereon a belt driving face and a belt receiving face of smaller diameter adapted to loosely engage the belt in non-driving engagement when idle, and an intermediate face adapted to cause said belt receiving face to drive the belt while being shifted to said driving face, and means to retain the belt upon said driven pulley when the belt is in engagement with said driving face and when it is in engagement with said non-driving face.

4. Belt drive mechanism, comprising a driving pulley, a driven pulley and a belt connecting said pulleys characterized by the feature that one of said pulleys has a driving face and a non-driving face of smaller diameter joined integrally therewith by an intermediate inclined face, and constructed and arranged to receive the belt in non-driving engagement.

5. Belt drive mechanism, comprising a driving pulley, a driven pulley and a belt connecting said pulleys, characterized by the feature that one of said pulleys has a driving face and a non-driving face of smaller diameter joined therewith, said non-driving face being construucted and arranged to always receive the belt in non-driving engagement.

6. Belt drive mechanism, comprising, a driving pulley, a driven pulley, and a belt connecting said pulleys, characterized by the feature that one of said pulleys has integrally thereon a driving face and a non-driving face of smaller diameter rigid therewith and is arranged below the other pulley so that the belt hangs loosely therearound out of driving contact therewith, and that a stationary belt guide is provided at the upper pulley and a belt shifter at the lower pulley.

In testimony whereof I affix my signature this 7th day of December, 1921.

STEPHEN A. DOBYNE.